United States Patent
Cho et al.

(10) Patent No.: US 11,051,007 B2
(45) Date of Patent: Jun. 29, 2021

(54) IMAGE-CAPTURE TESTING DEVICE AND SYSTEM

(71) Applicant: TRIPLE WIN TECHNOLOGY(SHENZHEN) CO.LTD., Shenzhen (CN)

(72) Inventors: Yu-An Cho, New Taipei (TW); Wen-Chieh Lin, New Taipei (TW); Ye-Quang Chen, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 16/699,948

(22) Filed: Dec. 2, 2019

(65) Prior Publication Data

US 2021/0136355 A1    May 6, 2021

(30) Foreign Application Priority Data

Oct. 30, 2019    (CN) .......................... 201911047075.4

(51) Int. Cl.
*H04N 17/00*    (2006.01)
*G06T 7/00*    (2017.01)

(52) U.S. Cl.
CPC ......... *H04N 17/002* (2013.01); *G06T 7/0002* (2013.01); *G06T 2207/30168* (2013.01)

(58) Field of Classification Search
CPC .. H04N 17/002; H04N 13/246; G06T 7/0002; G06T 2207/30168

USPC ........................ 348/187, 189, 180, 181, 92
See application file for complete search history.

(56) References Cited

U.S. PATENT DOCUMENTS

| | | | |
|---|---|---|---|
| 9,225,977 B2* | 12/2015 | Lewinnek | H04N 17/002 |
| 10,478,137 B2* | 11/2019 | Liu | A61B 5/0035 |
| 2014/0240518 A1* | 8/2014 | Lewinnek | H04N 17/002 |
| | | | 348/187 |
| 2014/0240519 A1* | 8/2014 | Lewinnek | H04N 5/2257 |
| | | | 348/187 |
| 2015/0049188 A1* | 2/2015 | Harrell | F16M 11/18 |
| | | | 348/139 |
| 2015/0092906 A1* | 4/2015 | Liu | A61B 6/4417 |
| | | | 378/4 |

FOREIGN PATENT DOCUMENTS

TW    M534485 U    12/2016

* cited by examiner

*Primary Examiner* — Paulos M Natnael
(74) *Attorney, Agent, or Firm* — ScienBiziP, P.C.

(57) ABSTRACT

A device to test image-capturing abilities of photosensitive components includes a movable assembly and a fixing assembly. The movable assembly includes a first wireless transmission module. The fixing assembly comprises a second wireless transmission module. The second wireless transmission module is wirelessly connected to the first wireless transmission module avoiding wire entanglement or winding as the movable assembly is rotated. The first wireless transmission module receives image signals from a camera module and wirelessly sends the image signals to the second wireless transmission module.

8 Claims, 6 Drawing Sheets

IMAGE-CAPTURE TESTING DEVICE AND SYSTEM

FIELD

The subject matter herein generally relates to component testing, and in particular to an image-capture testing device and system for data transmission using a wireless transmission chip.

BACKGROUND

When a machine uses four image-capture test platforms, to prevent signal lines of the machine being wound up during rotation, the machine must rotate 270 degrees first and then rotate back to 0 degrees. However, such a configuration mat adversely affect the speed of testing, so that the machine has a slower speed for data transmitting and a lower efficiency.

Therefore, there is room for improvement within the art.

BRIEF DESCRIPTION OF THE DRAWING

Many aspects of the disclosure can be better understood with reference to the figure. The components in the figures are not necessarily drawn to scale, the emphasis instead being placed upon clearly illustrating the principles of the disclosure.

DETAILED DESCRIPTION

Figure 1:
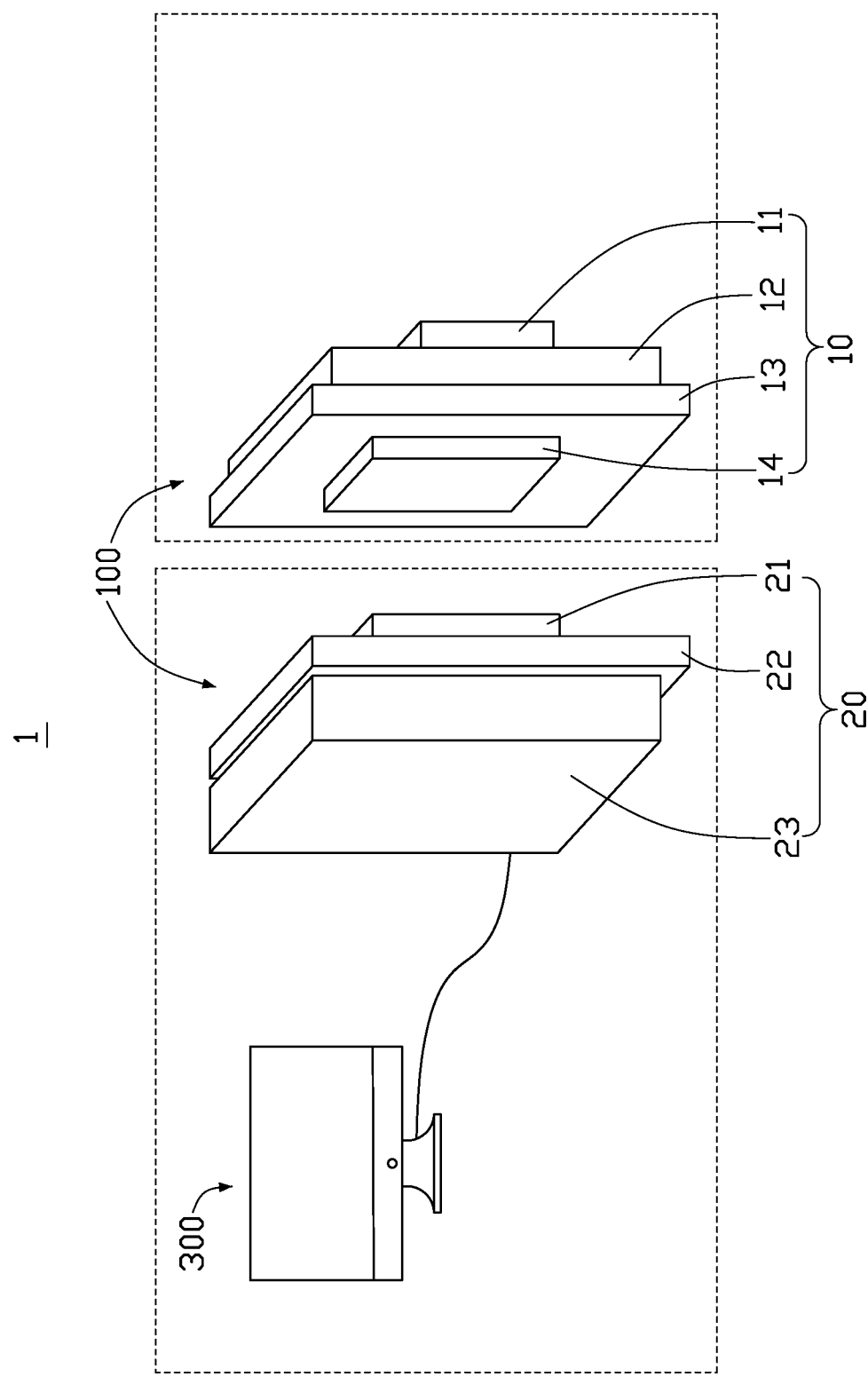
FIG. 1 is a schematic diagram of an image-capture testing system according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates an image-capture testing device 100. The image-capture testing device 100 can be positioned on a machine 200 (shown in FIG. 2). The image-capture testing device 100 includes a movable assembly 10 and a fixing assembly 20.

Figure 2:
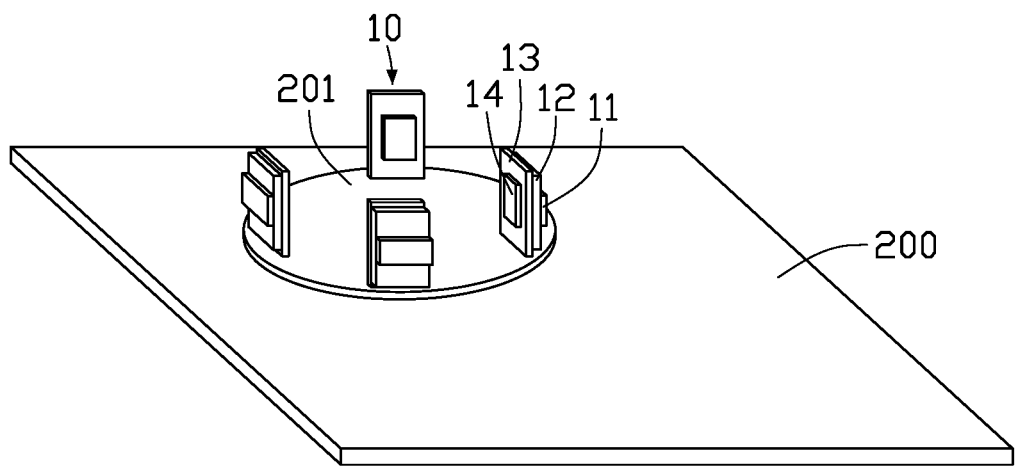
FIG. 2 is a schematic diagram showing a movable assembly of the image-capture testing device of FIG. 1.

As illustrated in FIG. 2, the movable assembly 10 is positioned on a turntable 201 of the machine 200 and rotates along with the turntable 201. The fixing assembly 20 is positioned below the machine 200 and is in communication with a computer 300 by a signal line. The signal line can be, but is not limited to, a USB 3.0 signal line.

The movable assembly 10 includes a fixture 12, a first signal transfer board 13, and a first wireless transmission module 14. The fixture 12 may be in a lotus-leaf shape. The fixture 12 is configured to receive a camera module 11. The fixture 12 is further electrically connected to the camera module 11 for receiving an image signal from the camera module 11.

The first signal transfer board 13 is positioned at one side of the fixture 12 away from the camera module 11. The first signal transfer board 13 is electrically connected to the fixture 12.

The first wireless transmission module 14 is positioned at one side of the first signal transfer board 13 away from the fixture 12. The first wireless transmission module 14 can be a wireless transmission chip and is electrically connected to the first signal transfer board 13.

In this embodiment, the first signal transfer board 13 is configured to receive the image signal from the fixture 12 and send the received image signal to the first wireless transmission module 14. The first wireless transmission module 14 then sends the received image signal to the fixing assembly 20.

The fixing assembly 20 includes a second wireless transmission module 21, a second signal transfer board 22, and an image-capture testing platform 23.

The second wireless transmission module 21 is wirelessly connected to the first wireless transmission module 14. The second wireless transmission module 21 is configured to receive the image signal from the first wireless transmission module 14. The second wireless transmission module 21 further transmits the image signal to the second signal transfer board 22. In one embodiment, the second wireless transmission module 21 can be a wireless transmission chip.

The second signal transfer board 22 is positioned at one side of the second wireless transmission module 21 and is electrically connected to the second wireless transmission module 21. The second signal transfer board 22 is configured to receive the image signal from the second wireless transmission module 21 and transmit the image signal to the image-capture testing platform 23.

Figure 3:
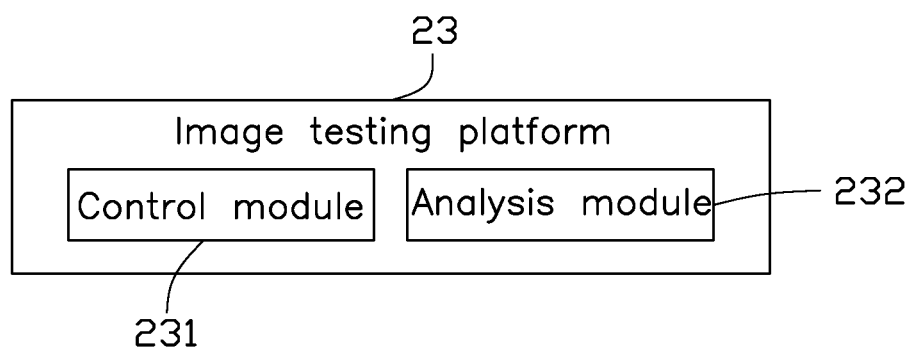
FIG. 3 is a block diagram of an image-capture testing platform of FIG. 1.

As illustrated in FIG. 3, in one embodiment, the image-capture testing platform 23 is positioned at one side of the second signal transfer board 22 away from the second wireless transmission module 21 and is electrically connected to the second signal transfer board 22. The image-capture testing platform 23 includes a control module 231 and an analysis module 232.

The control module 231 is electrically connected to the second signal transfer board 22 and is configured to output a control signal to the camera module 11 for controlling the camera module 11 to capture images. The control module 231 further outputs the signals as to images captured.

The analysis module 232 is electrically connected to the second signal transfer board 22 and is configured to receive the image signal from the second signal transfer board 22. The analysis module 232 further processes the image signal into a photo signal and then transmits the photo signal to the computer 300 through the signal line. In one embodiment, the photo signal processed by the analysis module 232 can be displayed on the computer 300.

The computer 300 is configured to display an image based on the received photo signal. In this way, a quality of the camera module 11 is assessed by observing the image.

Figure 4:
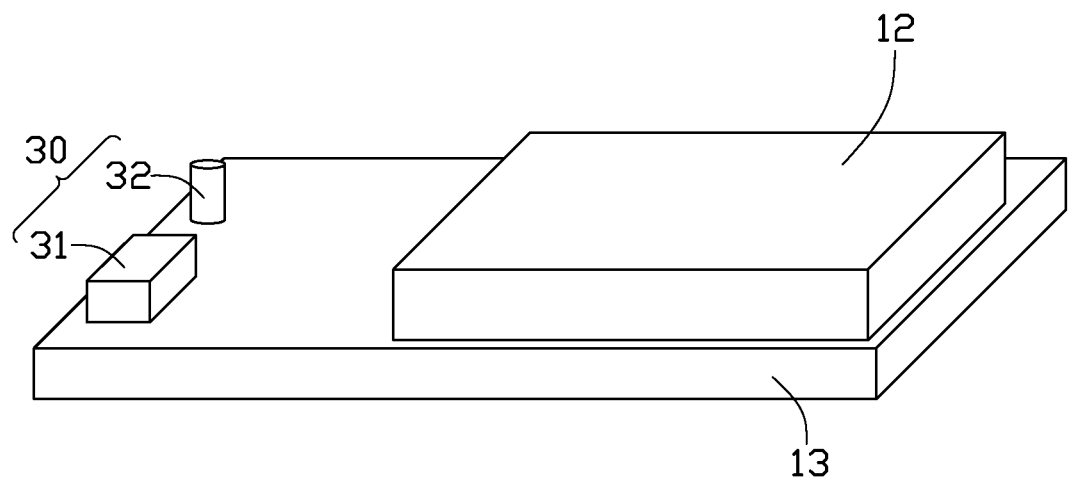
FIG. 4 is a schematic diagram of a power managing module of the image-capture testing device of FIG. 1.

As illustrated in FIG. 4, in this embodiment, the image-capture testing device 100 further includes a power management module 30. The power management module 30 is positioned on the first signal transfer board 13. In one embodiment, the power management module 30 includes a power unit 31 and a power indicator light 32. The power unit 31 is configured to supply power to various components or units of the image-capture testing device 100, for example, the movable assembly 10.

The power unit 31 can be a battery. In one embodiment, the power unit 31 includes a voltage dividing circuit (not shown). The voltage dividing circuit is configured to divide a main power supply into a plurality of voltages. For example, the voltage dividing circuit can divide a 5V voltage into voltages of 3.3V, 1.8V, and 1.2V. Further, these voltages can be separately provided to each unit or component of the image-capture testing device 100.

The power indicator light 32 is electrically connected to the power unit 31 and indicates power status of the power unit 31. Generally, when the power unit 31 is powered, the power unit 31 illuminates the power indicator light 32. The power indicator light 33 being illuminated indicates that the power unit 31 can provide power. When the power indicator light 33 is not illuminated, this indicates that the power unit 31 is unable to provide power and the power unit 31 needs to be charged or be replaced.

Figure 5:
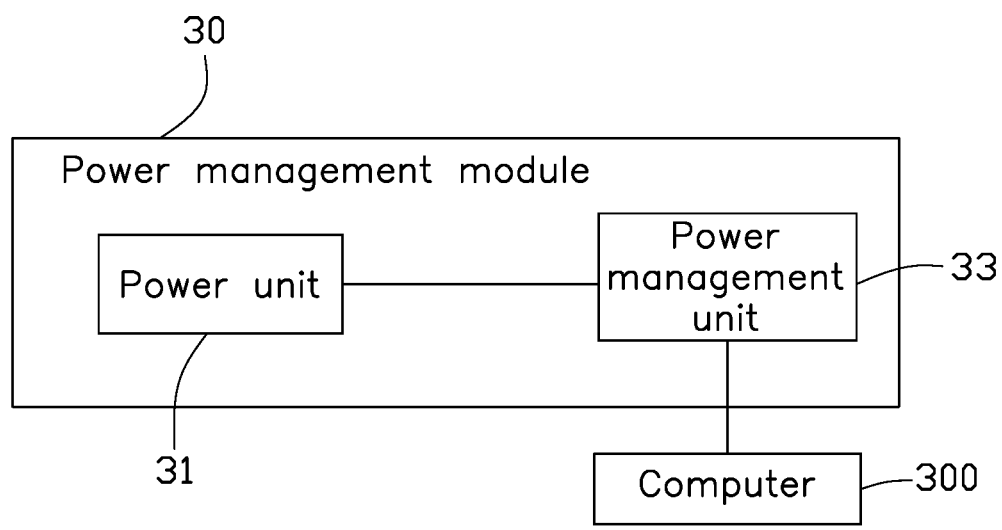
FIG. 5 is a circuit diagram of the power managing module of FIG. 4.

As illustrated in FIG. 5, in other embodiments, the power indicator light 32 can be omitted and the power management module 30 can include a power management unit 33. That is, the power indicator light 32 can be replaced by the power management unit 33.

The power management unit 33 is electrically connected to the power unit 31 and the computer 300. Then, the power unit 31 sends an electrical signal to the power management unit 33. The power management unit 33 receives the electrical signal from the power unit 31 and transmits the electrical signal to the computer 300 through an integrated circuit bus (I2C). The computer 300 reads the electrical signal from the power management unit 33 to determine whether the power unit 31 need to be charged or be replaced.

For example, if a level of power of the electrical signal received by the computer 300 is greater than or equal to a preset value stored in the computer 300, the power unit 31 does not need to be charged or be replaced. When the level of power of the electrical signal received by the computer 300 is less than the preset value stored in the computer 300, the power unit 31 needs to be charged or be replaced.

Referring to FIG. 1, FIG. 2, and FIG. 3, when the image-capture testing device 100 is used, the power unit 31 is firstly activated to enable the power unit 31 to supply power. Then, the control module 231 controls the camera module 11 to capture photos and send an image signal. The camera module 11 transmits the image signal to the first wireless transmission module 14 through the fixture 12 and the first signal transfer board 13. The first wireless transmission module 14 then wirelessly transmits the image signal to the second wireless transmission module 21. The second wireless transmission module 21 receives the image signal and transmits the image signal to the analysis module 232 through the second signal transfer board 22. The analysis module 232 processes the image signal into a photo signal and displays the photo signal on the computer 300 for quality assessment.

In this embodiment, the first wireless transmission module 14 and the second wireless transmission module 21 are limited in respect of distance and bandwidth. For example, when the first wireless transmission module 14 and the second wireless transmission module 21 are a short distance apart, then the first wireless transmission module 14 and the second wireless transmission module 21 require a high frequency wireless communication. When the first wireless transmission module 14 and the second wireless transmission module 21 are a long distance apart, the first wireless transmission module 14 and the second wireless transmission module 21 require a low frequency wireless communication.

In this embodiment, the distance is a distance between the first wireless transmission module 14 and the second wireless transmission module 21. Therefore, when the image-capture testing device 100 operates over a short distance, the first wireless transmission module 14 and the second wireless transmission module 21 may be wireless modules that can transmit high frequency signals. When the image-capture testing device 100 operates over a long distance, the first wireless transmission module 14 and the second wireless transmission module 21 may be wireless modules that can transmit low frequency signals.

In this embodiment, since the camera module 11 needs to load an initial value, the first wireless transmission module 14 and the second wireless transmission module 21 may be modules having a micro control unit (MCU). Then the first wireless transmission module 14 and the second wireless transmission module 21 can transmit signals after loading the initial value, thereby avoiding the loading of the initial value when the turntable 201 rotates each time.

Figure 6:
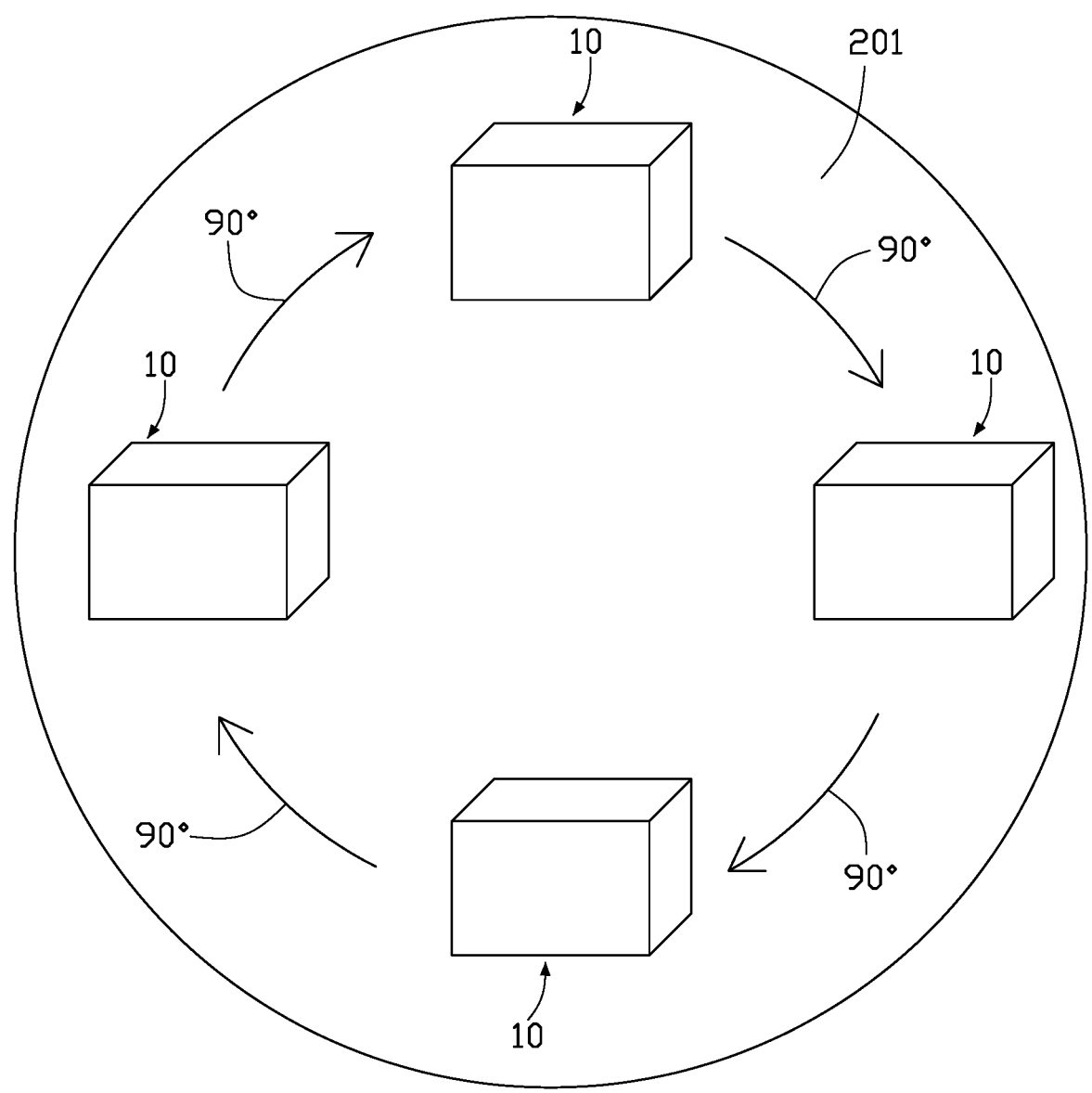
FIG. 6 is a schematic diagram showing the movable assembly of FIG. 1 rotatable through 360 degrees.

Referring to FIG. 2 and FIG. 6, in this embodiment, four image-capture testing devices 100 for example can be placed on one machine 200. Then multiple camera modules 11 can be tested simultaneously.

In this embodiment, an image-capture testing system 1 is further provided. The image-capture testing system 1 includes at least one image-capture testing device 100, a machine 200, and a computer 300. The at least one image-capture testing device 100 is positioned on the machine 200. The at least one image-capture testing device 100 is configured to test the quality of the camera modules 11. The at least one image-capture testing device 100 is electrically connected to the computer 300. The at least one image-capture testing device 100 outputs image signals to the computer 300, and the computer 300 determines whether a quality of the camera module 11 is high quality and fit for being passed or otherwise.

For example, in this embodiment, the image-capture testing system 1 includes four image-capture testing devices 100. Each image-capture testing device 100 corresponds to one camera module 11. When a camera module 11 is first tested, the turntable 201 is rotated 90 degrees along a predetermined direction, for example, clockwise, for testing a second camera module 11. In this way, according to the predetermined direction, the turntable 201 is sequentially rotated while the four camera modules 11 are tested.

In this embodiment, the first wireless transmission module 14 performs wireless signal transmission with the second wireless transmission module 21, then when the image-capture testing system 1 realizes 360 degrees of rotation, a problem of winding wires of the turntable 201 in the machine 200 during rotation is avoided, thereby achieving an improvement of transmission efficiency.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An image-capture testing system, the system comprising:
    a machine comprising a turntable;
    a computer; and
    a plurality of image-capture testing devices, each of the plurality of image-capture testing devices comprising:
        a movable assembly, the movable assembly of each of the plurality of image-capture testing devices positioned on the same turntable and rotated with the turntable, the movable assembly comprising a first wireless transmission module, the first wireless transmission module configured to receive an image signal from a camera module; and
        a fixing assembly positioned below the turntable and electrically connected to the computer, the fixing assembly comprising a second wireless transmission module;
    wherein the second wireless transmission module is wirelessly connected to the first wireless transmission module and receives the image signal from the first wireless transmission module.

2. The system of claim 1, wherein the computer receives the image signal from the camera module and determines whether a quality of the camera module is qualified.

3. The system of claim 1,
    wherein the movable assembly further comprises a fixture and a first signal transfer board, the fixture is configured to receive the camera module and is electrically connected to the camera module, the first signal transfer board is positioned at one side of the fixture away from the camera module and is electrically connected to the fixture; and
    wherein the first wireless transmission module is positioned at one side of the first signal transfer board away from the fixture and is electrically connected to the first signal transfer board, the image signal is transmitted from the camera module to the fixture, the first signal transfer board, and the first wireless transmission module in said order.

4. The system of claim 3, wherein the fixing module further comprises a second signal transfer board and an image-capture testing platform, the second signal transfer board is positioned at one side of the second wireless transmission module and is electrically connected to the second wireless transmission module, the image-capture testing platform is positioned at one side of the second signal transfer board away from the second wireless transmission module and is electrically connected to the second signal transfer board; wherein the second wireless transmission module receives the image signal from the first wireless transmission module and transmits the image signal to the second signal transfer board and the image-capture testing platform.

5. The system of claim 4, wherein the image-capture testing platform comprises a control module and an analysis module, the control module is configured to output a control signal to the camera module for controlling the camera module to output the image signal, the analysis module is configured to receive the image signal from the second signal transfer board, processes the image signal into a photo signal, and transmits the photo signal to the computer.

6. The system of claim 1, wherein each of the plurality of image-capture testing devices further comprises a power management module, the power management module is positioned on the first signal transfer board and supplies power to the movable assembly.

7. The system of claim 6,
    wherein the power management module comprises a power unit and a power indicator light, the power unit is electrically connected to the movable assembly for supplying power to the movable assembly;
    wherein the power indicator light is electrically connected to the power unit for indicating power states of the power unit.

8. The system of claim 6,
    wherein the power management module comprises a power unit and a power management unit, the power unit is electrically connected to the movable assembly for supplying power to the movable assembly;
    wherein the power management unit is electrically connected to the power unit and a computer, the power unit sends an electrical signal to the power management unit, the power management unit receives the electrical signal from the power unit and transmits the electrical signal to the computer, the computer reads the electrical signal to determine whether the power unit be charged or replaced.

* * * * *